United States Patent [19]

Kawayachi et al.

[11] Patent Number: 5,345,269
[45] Date of Patent: Sep. 6, 1994

[54] ADAPTIVE PREDICTION ENCODING DEVICE WHICH CAN EFFECTIVELY REFRESH AN ENCODED SIGNAL WITH AN ENCODING EFFICIENCY KEPT HIGH

[75] Inventors: Noboru Kawayachi, Tokyo; Toru Shibuya, Miyagi, both of Japan

[73] Assignee: NEC Corporation, Tokyo, Japan

[21] Appl. No.: 123,064

[22] Filed: Sep. 17, 1993

[30] Foreign Application Priority Data

Sep. 17, 1992 [JP] Japan .................. 4-247030

[51] Int. Cl.⁵ .............................. H04N 7/13
[52] U.S. Cl. ............................ 348/412; 348/11
[58] Field of Search ..................... 348/411–417; 358/136; H04N 7/13

[56] References Cited

U.S. PATENT DOCUMENTS

| | | | |
|---|---|---|---|
| 4,437,119 | 3/1984 | Matsumoto et al. | 348/412 |
| 4,633,325 | 12/1986 | Usubuchi | 348/411 X |
| 5,164,828 | 11/1992 | Tahava et al. | 348/412 |

Primary Examiner—Victor R. Kostak
Attorney, Agent, or Firm—Sughrue, Mion, Zinn, Macpeak & Seas

[57] ABSTRACT

In an adaptive prediction encoding device which carries out adaptive encoding of a digital picture signal by making a selector adaptively select a two-previous predictor, a previous field predictor, and a higher order intraline predictor in accordance with the digital picture signal, a first selection forcing circuit forces a selector to select the higher order intraline predictor at first timing of fixed scanning lines which periodically appear at a period of (2N+1) scanning lines in each field of successive frames of the digital picture signal, where N represents a natural number. A second selection forcing circuit forces the selector to select the higher order intraline predictor at second timing of additional scanning lines which precede the fixed scanning lines by (m−1) scanning lines in each field of an m-th frame of the digital picture signal, where m consecutively varies from 2 to (2N+1) which is equal to M.

6 Claims, 5 Drawing Sheets

ADAPTIVE PREDICTION ENCODING DEVICE WHICH CAN EFFECTIVELY REFRESH AN ENCODED SIGNAL WITH AN ENCODING EFFICIENCY KEPT HIGH

BACKGROUND OF THE INVENTION

This invention relates to an encoding device for encoding a digital picture signal into an encoded signal and, more particularly, to an adaptive prediction encoding device.

A digital picture signal is typically an NTSC television signal and comprises successive frames, each frame comprising first and second fields. Each field comprises a plurality of scanning lines. When the digital picture signal is the NTSC television signal, each frame comprises 525 scanning lines.

An encoding device of the type described, comprises a predictive encoder. Responsive to the digital picture signal and a prediction picture signal, the predictive encoder predictively encodes the digital picture signal into the encoded signal by using the prediction picture signal. A local decoder locally decodes the encoded signal into a local decoded signal in response to the prediction picture signal.

A first predictor produces a first prediction signal by delaying the local decoded signal by a first delay equal to a first time duration of two successive scanning lines of the digital picture signal. The first predictor is therefore called a two-previous line predictor in the art. A second predictor produces a second prediction signal by delaying the local decoded signal by a second delay equal to a second time duration of the first field of the digital picture signal when the digital picture signal is the NTSC television signal. The second predictor is therefore named either a previous field predictor or a 262 previous line predictor. A third predictor produces a third prediction signal by delaying the local decoded signal by a third delay less than a third time duration of one scanning line of the digital picture signal. The third predictor is, for example, a higher order intraline predictor.

A comparator compares the first through the third prediction signals with the local decoded signal to produce a control signal. Responsive to the control signal, a selector selects one of the first through the third prediction signals as the prediction picture signal.

The encoding device encodes the digital picture signal into the encoded signal by adaptively switching the first through the third predictors in accordance with the digital picture signal and is therefore called an adaptive prediction encoding device.

The encoding device transmits the encoded signal to a decoding device through a transmission path. When a bit error occurs in a particular picture element of the encoded signal due to the transmission path, the bit error of the particular picture element is propagated to subsequent picture elements which are predictively decoded in the decoding device by using the particular picture element. In order to prevent such propagation of the bit error, refreshment of the encoded signal is carried out in the encoding device.

In order to carry out the refreshment, a conventional encoding device comprises a selection forcing circuit. Responsive to the digital picture signal, the selection forcing circuit forces the selector to select the third prediction signal as the prediction picture signal irrespective of the control signal at the timing of fixed scanning lines which periodically appear at a period of $(2N+1)$ scanning lines in each frame of the digital picture signal, where N represents a natural number. As a result, the refreshment is carried out by forcedly using the third predictor on the fixed scanning lines which periodically appears at the period of $(2N+1)$ scanning lines in each frame of the digital picture signal.

Inasmuch as the natural number N is typically 2, the period $(2N+1)$ of the fixed scanning lines becomes equal to 5 scanning lines. When $(2N+1)$ is equal to 5, the fixed scanning lines correspond to the 1st, the 6th, the 11th, . . . , and the 521st scanning lines of each frame of the digital picture signal.

When N is selected as a small number, the number of the fixed scanning lines increases in each frame. Inasmuch as the third predictor, such as the higher order intraline predictor, is frequently and forcedly used in this case, it is difficult to attain a high encoding efficiency. When N is selected as a large number, the number of the fixed scanning lines decreases in each frame. In this case, it is not possible to effectively refresh the encoded signal.

Thus, the conventional encoding device can not effectively refresh the encoded signal with the encoding efficiency kept high because the refreshment is carried out only on the fixed scanning lines of each frame.

SUMMARY OF THE INVENTION

It is therefore an object of this invention to provide an encoding device which can effectively refresh an encoded signal with an encoding efficiency kept high.

Other objects of this invention will become clear as the description proceeds.

An encoding device to which this invention is applicable is for encoding a digital picture signal into an encoded signal. The digital picture signal comprises first through M-th frames, where M represents a plural number. Each frame comprises first and second fields. Each field comprises a plurality of scanning lines. The device includes: a predictive encoder responsive to the digital picture signal and a prediction picture signal for predictively encoding the digital picture signal into the encoded signal by using the prediction picture signal; a local decoder responsive to the encoded signal and the prediction picture signal for locally decoding the encoded signal into a local decoded signal; a first predictor responsive to the local decoded signal for producing a first prediction signal by delaying the local decoded signal by a first delay equal to a first time duration of two successive scanning lines of the digital picture signal; a second predictor responsive to the local decoded signal for producing a second prediction signal by delaying the local decoded signal by a second delay equal to a second time duration of the first field of the digital picture signal; a third predictor responsive to the local decoded signal for producing a third prediction signal by delaying the local decoded signal by a third delay less than a third time duration of one scanning line of the digital picture signal; a comparator for comparing the first through the third prediction signals with the local decoded signal to produce a control signal; and a selector responsive to the control signal for selecting one of the first through the third prediction signals as the prediction picture signal.

According to this invention, the device comprises: a first selection forcing circuit connected to the selector and responsive to the digital picture signal for forcing the selector to select the third prediction signal as the prediction picture signal irrespective of the control signal at first timing of fixed scanning lines which periodically appear at a period of (2N+1) scanning lines in each field of the first through the M-th frames of the digital picture signal, where N represents a natural number; and a second selection forcing circuit connected to the selector and responsive to the digital picture signal for forcing the selector to select the third prediction signal as the prediction picture signal irrespective of the control signal at second timing of additional scanning lines which precede the fixed scanning lines by (m−1) scanning lines in each field of an m-th frame of the digital picture signal, where m consecutively varies from 2 to (2N+1) which is equal to M.

DESCRIPTION OF THE PREFERRED EMBODIMENTS

Figure 1:
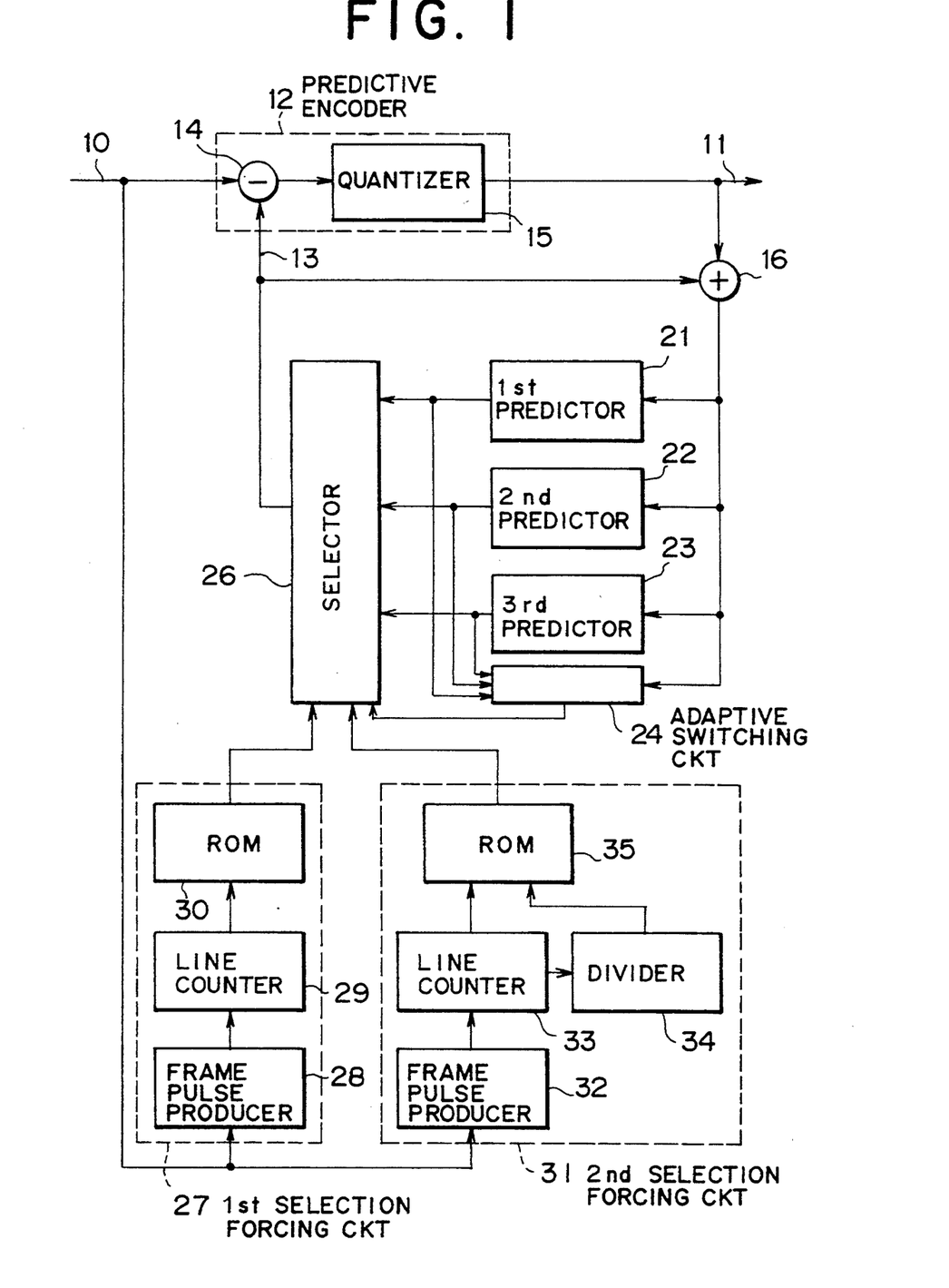
FIG. 1 is a block diagram of an encoding device according to a first embodiment of this invention.

Referring to FIG. 1, an encoding device according to a first embodiment of this invention is for encoding a digital picture signal 10 into an encoded signal 11. The digital picture signal 10 is typically an NTSC television signal with interlaced scanning and comprises successive multiframes, each multiframe comprising first through M-th frames or pictures, where M represents a plural number. Inasmuch as the digital picture signal 10 is subjected to the interlaced scanning, each frame comprises first and second fields. Each field comprises a plurality of scanning lines. When the digital picture signal 10 is the NTSC television signal, the first and the second fields comprise 262 and 263 scanning lines, respectively. The device comprises a predictive encoder 12. Responsive to the digital picture signal 10 and a prediction picture signal 13, the predictive encoder 12 predictively encodes the digital picture signal 10 into the encoded signal 11 by using the prediction picture signal 13.

The predictive encoder 12 comprises a subtracter 14 and a quantizer 15. Responsive to the digital picture signal 10 and the prediction picture signal 13, the subtracter 14 produces a prediction error equal to a difference between the digital picture signal 10 and the prediction picture signal 13. Thus, the subtracter 14 serves as a prediction error producer which produces the prediction error equal to the difference between the digital picture signal 10 and the prediction picture signal 13. The quantizer 15 quantizes the prediction error into a quantized signal for use as the encoded signal 11.

Responsive to the encoded signal 11 and the prediction picture signal 13, an adder 16 adds the prediction picture signal 13 to the encoded signal 11 to locally decode the encoded signal 11 into a local decoded signal. Thus, the adder 16 operates as a local decoder which locally decodes the encoded signal 11 into the local decoded signal in response to the encoded signal 11 and the prediction picture signal 13.

A first predictor 21 is a two-previous line predictor and produces a first prediction signal by delaying the local decoded signal by a first delay equal to a first time duration of two successive scanning lines of the digital picture signal 10. A second predictor 22 is a previous field predictor (or a 262 previous line predictor) and produces a second prediction signal by delaying the local decoded signal by a second delay equal to a second time duration of the first field (namely, 262 scanning lines) of the digital picture signal 10. A third predictor 23 is a higher order intraline predictor and produces a third prediction signal by delaying the local decoded signal by a third delay less than a third time duration of one scanning line of the digital picture signal 10.

An adaptive switching circuit 24 serves as a comparator which compares the first through the third prediction signals with the local decoded signal to produce a control signal. Responsive to the control signal, a selector 26 selects one of the first through the third prediction signals as the prediction picture signal 13.

More specifically, the adaptive switching circuit 24 calculates first through third absolute values of differences between the first through the third prediction signals and the local decoded signal, respectively, and produces the control signal which specifies one of the first through the third prediction signals from which a minimum absolute value among the first through the third absolute values is produced. In response to the control signal, the selector 26 selects the one of the first through the third prediction signals that is specified by the control signal.

Thus, the encoding device serving as an adaptive prediction encoding device which carries out adaptive encoding by adaptively switching the first through the third predictors 21 to 23 in accordance with the digital picture signal 10.

A first selection forcing circuit 27 is connected to the selector 26. Responsive to the digital picture signal 10, the first selection forcing circuit 27 forces the selector 26 to select the third prediction signal as the prediction picture signal 13 irrespective of the control signal at first timing of fixed scanning lines which periodically appear at a period of (2N+1) scanning lines in each field of the first through the M-th frames of each multiframe of the digital picture signal 10, where N represents a natural number. As a result, refreshment is carried out by forcedly using the third predictor 23 on the fixed scanning lines which periodically appear at the period of (2N+1) scanning lines in each field of the first through the M-th frames of each multiframe of the digital picture signal 10.

When the natural number N is 3, the period (2N+1) of the fixed scanning lines becomes equal to 7. When (2N+1) is equal to 7, the fixed scanning lines correspond to the 1st, the 8th, the 15th, ..., and the 260th scanning lines of the first field of the digital picture signal 10 and to the 263rd, the 270th, the 277th, ..., and the 522nd scanning lines of the second field of the digital picture signal 10 when the digital picture signal 10 is the NTSC television signal.

Figure 2:
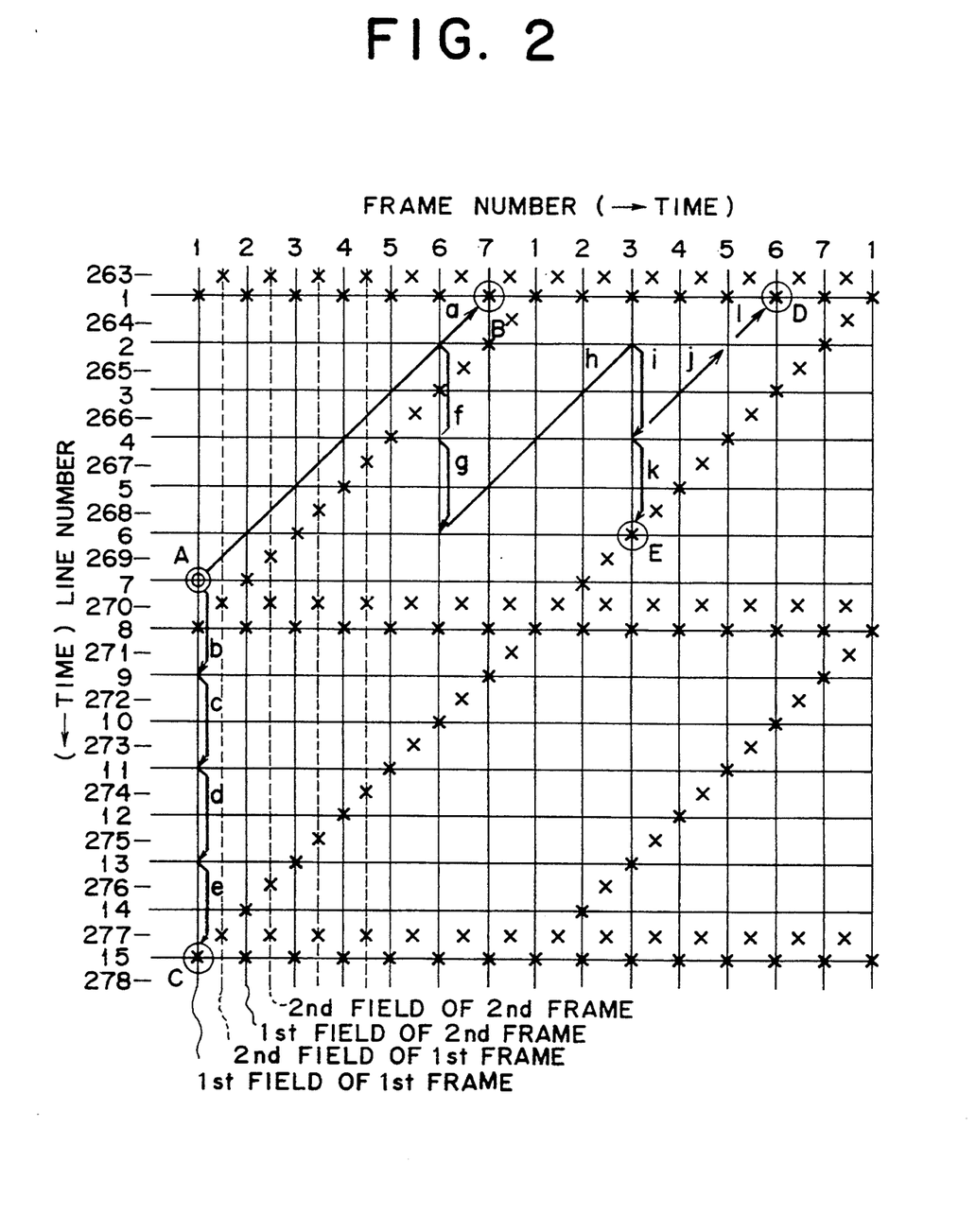
FIG. 2 is a diagram for use in describing operation of the encoding device illustrated in FIG. 1.

Turning to FIG. 2, the scanning lines on which the refreshment is carried out are illustrated by x. The fixed scanning lines of the first field of each frame correspond to the 1st, the 8th, and 15th in the illustrated example. The fixed scanning lines of the second field of each frame correspond to the 263rd, the 270th, and the 277th scanning lines.

Figure 3:
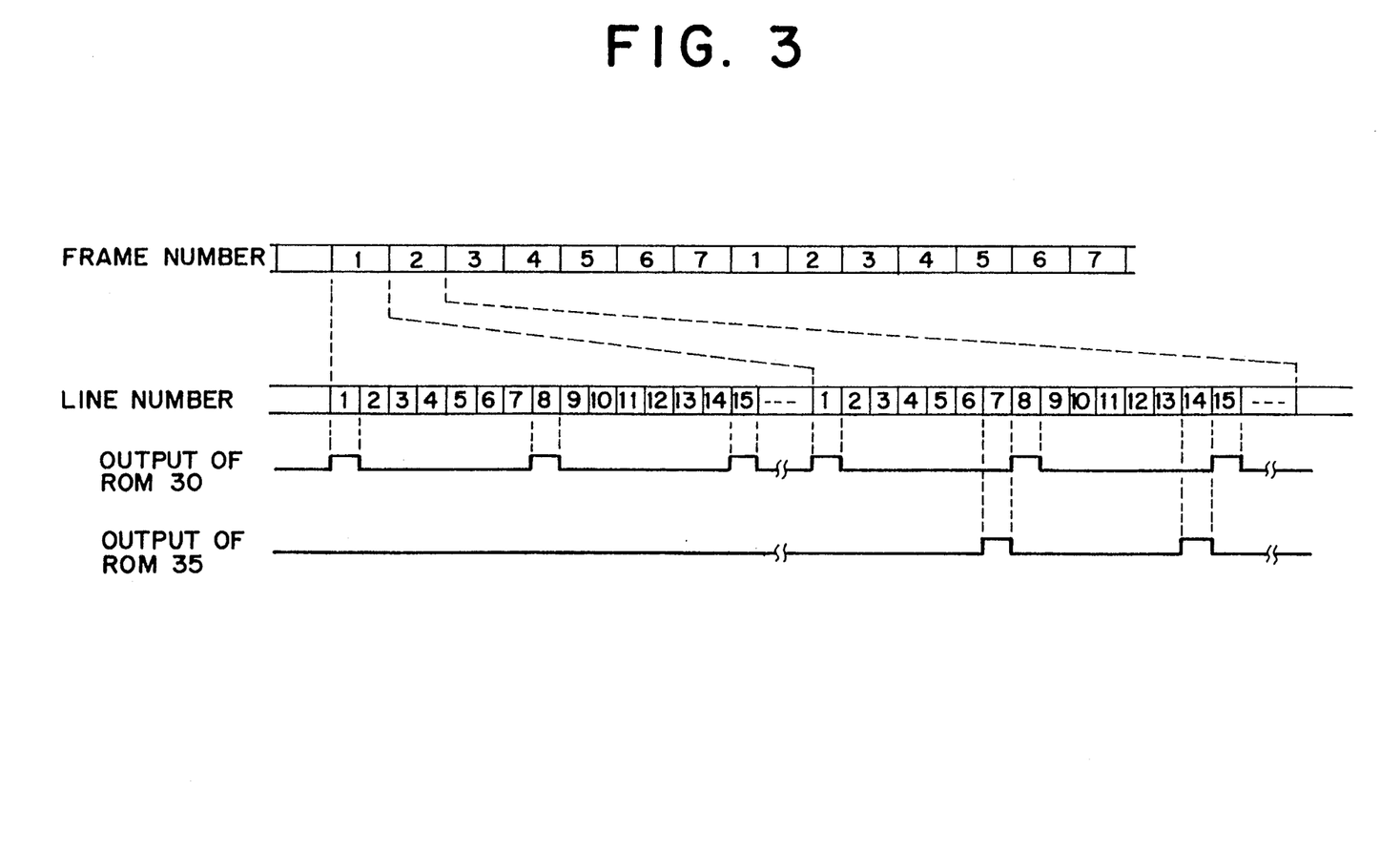
FIG. 3 is a timing chart for use in describing operation of the encoding device illustrated in FIG. 1.

Turning back to FIG. 1, the first selection forcing circuit 27 comprises a first frame pulse producer 28 which produces a frame pulse preceding the digital picture signal 10 of each frame. A first line counter 29 is reset in response to the frame pulse and counted up one by one each time when a time interval for a single scanning line lapses after the first line counter 29 is reset. The first line counter 29 produces a first counted signal representative of a first counted content thereof. A first ROM (read-only memory) 30 preliminarily memorizes a logic "1" level signal at each of addresses corresponding to line numbers of the fixed scanning lines of one frame of the digital picture signal 10 and a logic "0" level signal at each of addresses corresponding to line numbers of remaining scanning lines of one frame of the digital picture signal 10. The first ROM 30 is successively accessed at the addresses corresponding to the first counted content represented by the first counted signal. The first ROM 30 thereby produces the logic "1" level signal and the logic "0" level signal in the manner illustrated in FIG. 3. The selector 26 responds to the logic "1" level signal and selects the third prediction signal produced by the third predictor 23 as the prediction picture signal 13.

A second selection forcing circuit 31 is connected to the selector 26. Responsive to the digital picture signal 10, the second selection forcing circuit 31 forces the selector 26 to select the third prediction signal as the prediction picture signal 13 irrespective of the control signal at second timing of additional scanning lines which precede the fixed scanning lines by (m−1) scanning lines in each field of an m-th frame of each multiframe of the digital picture signal 10, where m consecutively varies from 2 to (2N+1) which is equal to M. As a result, refreshment is carried out by forcedly using the third predictor 23 on the additional scanning lines which precede the fixed scanning lines by the (m−1) scanning lines in each field of the m-th frame of each multiframe of the digital picture signal 10.

In FIG. 2, one of the fixed scanning lines is the 8th scanning line of the first field of 1st frame when the natural number N is 3 as described above. In connection with the 8th scanning line which is assigned to the fixed scanning line of the 1st frame, the additional scanning lines are the 7th scanning line of the first field of the 2nd frame, the 6th scanning line of the first field of the 3rd frame, the 5th scanning line of the first field of the 4th frame, the 4th scanning line of the first field of the 5th frame, the 3rd scanning line of the first field of the 6th frame, and the 2nd scanning line of the first field of the 7th frame.

In connection with the 270th scanning line of the second field of the 1st frame that is assigned to the fixed scanning line, the additional scanning lines are the 269th scanning line of the second field of the 2nd frame, the 268th scanning line of the second field of the 3rd frame, the 267th scanning line of the second field of the 4th frame, the 266th scanning line of the second field of the 5th frame, the 265th scanning line of the second field of the 6th frame, and the 264th scanning line of the second field of the 7th frame.

In FIG. 1, the second selection forcing circuit 31 comprises a second frame pulse producer 32 which produces a frame pulse like the first frame pulse producer 28. Responsive to the second frame pulse producer 32, a second line counter 33 produces a second counted signal representative of a second counted content thereof like the first line counter 29. The second line counter 33 produces a pulse as an output signal whenever the second line counter 33 counts one scanning line. A frequency divider 34 divides the output signal on the basis of a predetermined dividing number into a divided signal. The dividing number is equal to 525. A second ROM 35 is similar in structure and in operation to the first ROM 35 except the second ROM 35 has first through seventh memory areas corresponding to first through seventh frames of the digital picture signal 10. The first memory area of the second ROM 35 preliminarily memorizes a logic "1" level signal at each of addresses corresponding to line numbers of the additional scanning lines of the first frame of the digital picture signal 10 and a logic "0" level signal at each of addresses corresponding to line numbers of remaining scanning lines of the first frame of the digital picture signal 10. Likewise, the seventh memory area of the second ROM 35 preliminarily memorizes information of the additional scanning lines of the seventh frame of the digital picture signal 10. The first through the seventh memory areas of the second ROM 35 are consecutively and successively enabled by the divided signal of the divider 34. An enabled memory area of the second ROM 35 is successively accessed at the addresses corresponding to the second counted content represented by the second counted signal. The second ROM 35 thereby produces the logic "1" level signal and the logic "0" level signal in the manner illustrated in FIG. 3. The selector 26 responds to the logic "1" level signal and selects the third prediction signal produced by the third predictor 23 as the prediction picture signal 13.

In FIG. 2, it will be supposed that a bit error occurs in a point A due to a transmission path. When the second prediction signal of the second predictor (the previous field predictor) 22 (FIG. 1) is continuously selected by the adaptive switching circuit 24 (FIG. 1) and the selector 26 (FIG. 1), the bit error A is propagated in a direction a and is reset (or refreshed) at another point B. When the first prediction signal of the first predictor (the two-previous line predictor) 21 (FIG. 1) is continuously selected by the selector 26, the bit error A is propagated in another direction of b-c-d-e and is refreshed at still another point C.

When the bit error A is propagated in a direction a-f-g-h-i-j-l, the bit error is refreshed at a different point D. When the bit error A is propagated in a direction a-f-g-h-i-j-k, the bit error is reset at a specific point E.

In practice, the natural number N is selected to become equal to 10 to 15 in the encoding device of FIG. 1.

Figure 4:
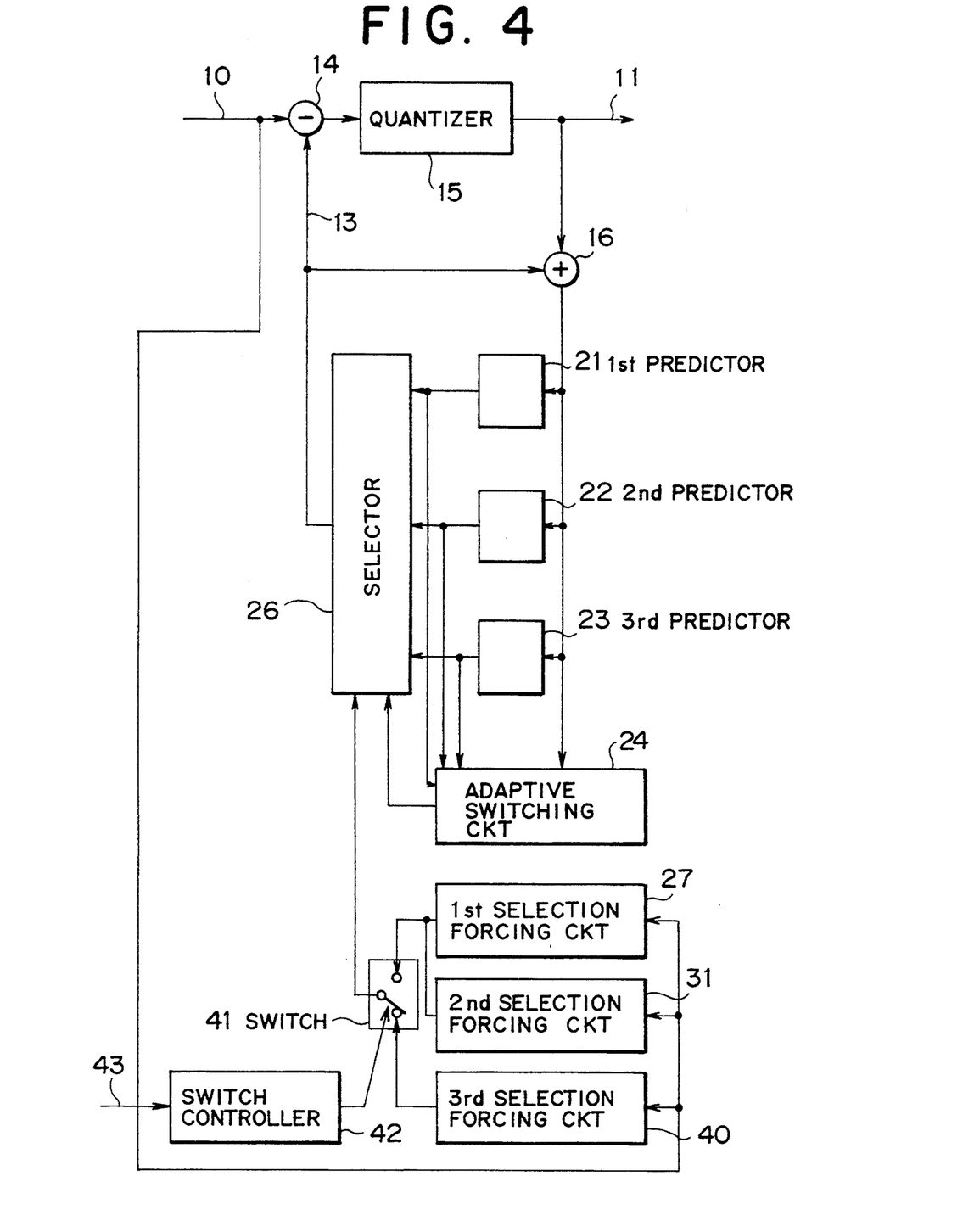
FIG. 4 is a block diagram of an encoding device according to a second embodiment of this invention.

Turning to FIG. 4, an encoding device according to a second embodiment of this invention is similar to the encoding device of FIG. 1 except for the following. A third selection forcing circuit 40 is connected to a switch 41. A switch controller 42 monitors power source voltage 43 supplied from a power source (not shown) which supplies an electric power to the encoding device. When a power source switch (not shown) is put into an on state, the switch controller 42 detects a leading edge of the power source voltage 43 and produces a high level signal during a predetermined time interval T in the manner illustrated in FIG. 5. When supplied with the high level signal, the switch 41 connects the third selection forcing circuit 40 to the selector 26. When supply of the high level signal is stopped, the switch 41 connects the first and the second selection forcing circuit 27 and 31 to the selector 26. In this case, the first and the second selection forcing circuits 27 and 31 operate in the manner similar to the encoding device of FIG. 1.

When the third selection forcing circuit 40 is connected to the selector 26 by the switch 41, the third selection forcing circuit 40 responds to the digital picture signal 10 and forces the selector 26 to select the third prediction signal as the prediction picture signal 13 irrespective of the control signal at a timing of fixed scanning lines which periodically appears at a period of (2N+1) scanning lines in each frame of the digital picture signal 10, where N represents a natural number which is equal to 2. That is, the period (2N+1) of the fixed scanning lines is 5 scanning lines. The fixed scanning lines are the 1st, the 6th, the 11th, ... , and the 521st scanning lines in the manner illustrated in FIG. 5 along a third row. The third selection forcing circuit 40 is similar in operation to the selection forcing circuit of the conventional decoding device described in the preamble of the instant specification.

Figure 5:
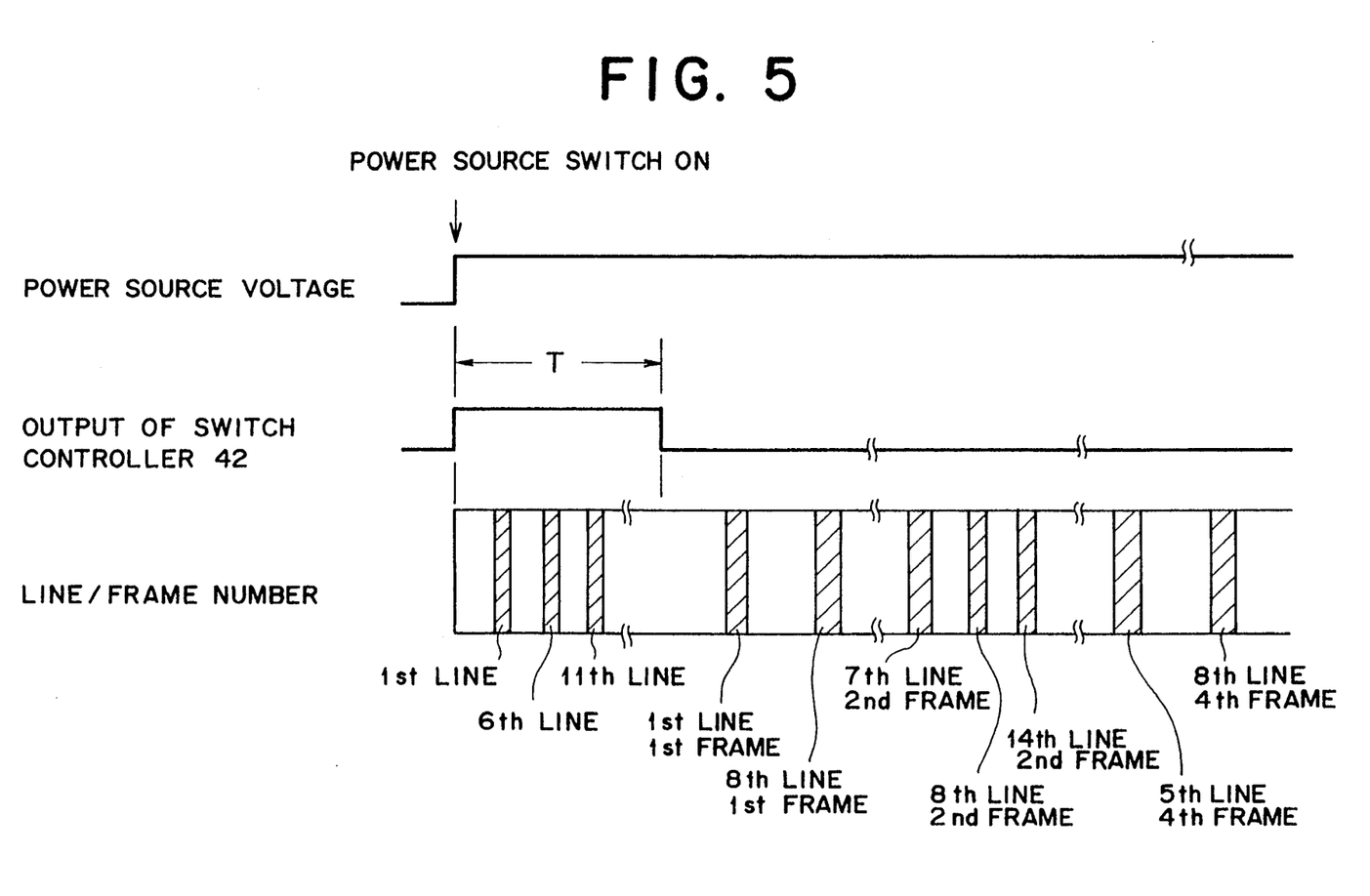
FIG. 5 is a timing chart for use in describing operation of the encoding device illustrated in FIG. 4.

In FIG. 5, the fixed and the additional scanning lines which are subjected to the refreshment, are illustrated along the third line. During the predetermined time interval T, the fixed scanning lines appear at the period of 5 scanning lines and are refreshed under the control of the third selection forcing circuit 40. After the predetermined time interval T lapses, the fixed scanning lines appear at the period of 7 scanning lines and are refreshed under the control of the first selection forcing circuit 27 as described above. In addition, the additional lines are refreshed by the second selection forcing circuit 31 as also described above.

A minimum value of the predetermined time interval T is determined as a time interval during which all scanning lines of one frame are refreshed by the third selection forcing circuit 40. Inasmuch as the third predictor 23 is forcedly selected at the period of 5 scanning lines to refresh the fixed lines of each frame in the illustrated example, the minimum value of the time interval T is a time duration of 5 fields, namely, about 80 milliseconds. When the natural number N is selected as 30 in the encoding device of FIG. 1, about 8 seconds are inevitably consumed in order to refresh all scanning lines of one frame.

While this invention has thus far been described in conjunction with two embodiments thereof, it will readily be possible for those skilled in the art to put this invention into practice in various other manners. For example, this invention is applicable to a different adaptive prediction encoding device comprising an additional predictor in addition to the first through the third predictors 21 to 23 of FIGS. 1 and 4. In this event, the additional predictor may be a two previous frame predictor which produces a prediction signal by delaying the local decoded signal by a delay equal to two successive frames of the digital picture signal. The different adaptive prediction encoding device carries out adaptive prediction encoding by switching the first through the third predictors and the additional predictor in accordance with the digital picture signal.

What is claimed is:

1. An encoding device for encoding a digital picture signal into an encoded signal, said digital picture signal comprising first through M-th frames, where M represents a plural number, each frame comprising first and second fields, each field comprising a plurality of scanning lines, said device including: a predictive encoder responsive to said digital picture signal and a prediction picture signal for predictively encoding said digital picture signal into said encoded signal by using said prediction picture signal; a local decoder responsive to said encoded signal and said prediction picture signal for locally decoding said encoded signal into a local decoded signal; a first predictor responsive to said local decoded signal for producing a first prediction signal by delaying said local decoded signal by a first delay equal to a first time duration of two successive scanning lines of said digital picture signal; a second predictor responsive to said local decoded signal for producing a second prediction signal by delaying said local decoded signal by a second delay equal to a second time duration of said first field of said digital picture signal; a third predictor responsive to said local decoded signal for producing a third prediction signal by delaying said local decoded signal by a third delay less than a third time duration of one scanning line of said digital picture signal; a comparator for comparing said first through said third prediction signals with said local decoded signal to produce a control signal; and a selector responsive to said control signal for selecting one of said first through said third prediction signals as said prediction picture signal, said device comprising:

a first selection forcing circuit connected to said selector and responsive to said digital picture signal for forcing said selector to select said third prediction signal as said prediction picture signal irrespective of said control signal at first timing of fixed scanning lines which periodically appear at a period of (2N+1) scanning lines in each field of said first through said M-th frames of said digital picture signal, where N represents a natural number; and a second selection forcing circuit connected to said selector and responsive to said digital picture signal for forcing said selector to select said third prediction signal as said prediction picture signal irrespective of said control signal at second timing of additional scanning lines which precede said fixed scanning lines by (m−1) scanning lines in each field of an m-th frame of said digital picture signal, where m consecutively varies from 2 to (2N+1) which is equal to M.

2. An encoding device as claimed in claim 1, wherein said predictive encoder comprises:

a prediction error producer responsive to said digital picture signal and said prediction picture signal for producing a prediction error equal to a difference between said digital picture signal and said prediction picture signal; and a quantizer for quantizing said prediction error into a quantized signal for use as said encoded signal.

3. An encoding device as claimed in claim 1, wherein said first and said second selection forcing circuits forces said selector to select said third prediction signal as said prediction picture signal in order to carry out refreshment of said encoded signal by said third prediction signal.

4. An encoding device for encoding a digital picture signal into an encoded signal, said digital picture signal comprising successive multiframes, each multiframe comprising first through M-th frames, where M represents a plural number, each frame comprising first and second fields, each field comprising a plurality of scanning lines, said device including: a predictive encoder responsive to said digital picture signal and a prediction picture signal for predictively encoding said digital picture signal into said encoded signal by using said prediction picture signal; a local decoder responsive to said encoded signal and said prediction picture signal for locally decoding said encoded signal into a local decoded signal; a first predictor responsive to said local decoded signal for producing a first prediction signal by delaying said local decoded signal by a first delay equal to a first time duration of two successive scanning lines of said digital picture signal; a second predictor responsive to said local decoded signal for producing a second prediction signal by delaying said local decoded signal by a second delay equal to a second time duration of said first field of said digital picture signal; a third predictor responsive to said local decoded signal for producing a third prediction signal by delaying said local decoded signal by a third delay less than a third time duration of one scanning line of said digital picture signal; a comparator for comparing said first through said third prediction signals with said local decoded signal to produce a control signal; and a selector responsive to said control signal for selecting one of said first through said third prediction signals as said prediction picture signal; said device comprising:

a first selection forcing circuit connected to said selector and responsive to said digital picture signal for forcing said selector to select said third prediction signal as said prediction picture signal irrespective of said control signal at first timing of fixed scanning lines which periodically appear at a period of $(2N+1)$ scanning lines in each field of said first through said M-th frames of each multiframe of said digital picture signal, where N represents a natural number; and a second selection forcing circuit connected to said selector and responsive to said digital picture signal for forcing said selector to select said third prediction signal as said prediction picture signal irrespective of said control signal at second timing of additional scanning lines which precede said fixed scanning lines by $(m-1)$ scanning lines in each field of an m-th frame of each multiframe of said digital picture signal, where m consecutively varies from 2 to $(2N+1)$ which is equal to M.

5. An encoding device as claimed in claim 4, wherein said predictive encoder comprises:

a prediction error producer responsive to said digital picture signal and said prediction picture signal for producing a prediction error equal to a difference between said digital picture signal and said prediction picture signal; and a quantizer for quantizing said prediction error into a quantized signal for use as said encoded signal.

6. An encoding device as claimed in claim 4, wherein said first and said second selection forcing circuits force said selector to select said third prediction signal as said prediction picture signal in order to carry out refreshment of said encoded signal by said third prediction signal.

* * * * *